United States Patent
Hotea et al.

(10) Patent No.: US 6,324,563 B1
(45) Date of Patent: Nov. 27, 2001

(54) CUSTOMER INFORMATION CONTROL SYSTEM APPLICATION PROGRAMMING INTERFACE, WITH GLOBAL AND LOCAL SYSTEM AND FILE CONTROL FUNCTIONS, IN A LOOSELY COUPLED DATA PROCESSING ENVIRONMENT

(75) Inventors: Andreas E. Hotea, San Jose; David G. Velasco, Campbell; Geoffrey A. McDonald, Cupertino, all of CA (US); Robert W. Redd, Roswell, GA (US)

(73) Assignee: Compaq Computer Corporation, Houston, TX (US)

(*) Notice: Subject to any disclaimer, the term of this patent is extended or adjusted under 35 U.S.C. 154(b) by 0 days.

(21) Appl. No.: 09/223,674

(22) Filed: Dec. 30, 1998

(51) Int. Cl.$^7$ .................................................. G06F 17/00
(52) U.S. Cl. ........................ 709/104; 707/8; 707/102; 709/201; 709/203
(58) Field of Search ............... 707/1–206; 709/201–203, 709/100–104

(56) References Cited

U.S. PATENT DOCUMENTS

| | | | |
|---|---|---|---|
| 5,794,234 | * 8/1998 | Church et al. | 709/201 |
| 5,978,842 | * 11/1999 | Noble et al. | 709/203 |
| 5,987,426 | * 11/1999 | Goodwin, III | 709/203 |

OTHER PUBLICATIONS

John Kneiling et al., "Understanding CICS Internals" Copyright 1992, including Contents, Introduction, Chapter 1, pp. 1–14, File Control, Chapter 7 pp. 145–155, Database Management, Chapter 8, pp. 157–172, Recovery/Restart Facilities, Chapter 13, pp. 221–243, McGraw–Hill, Inc.

(List continued on next page.)

Primary Examiner—Thomas Black
Assistant Examiner—David Jung
(74) Attorney, Agent, or Firm—Fenwick & West LLP

(57) ABSTRACT

The invention a customer information control system (CICS) application programming interface (API), with global and local system and file control functions, in a loosely coupled data processing system environment. In accordance with the purpose of the invention, as embodied and broadly described herein, the invention is directed to a method, system and computer readable medium for the local system and files control (hereafter collectively referred to as the "invention"). In particular, the invention includes implementing a loosely coupled CICS region in a data processing environment, the loosely coupled CICS region includes at least two of a plurality of machines and their respective address spaces. The invention further includes allocating a flat segment in the address space of the at least two machines. The invention additionally includes providing a keeper in the address space of each of the at least two machines, one of the keepers being designated as a master keeper. Furthermore, the invention includes providing more than one CICS-API operating system server (COSS) within the loosely coupled CICS region, each COSS residing in one of the at least two address spaces within the loosely coupled CICS region. The invention also includes providing in each COSS a suite of functions including the global and local system and file control functions so that each COSS is capable of registering as a flat segment user and interfacing with a keeper and a master keeper, and so that each COSS being further capable of interfacing via the keeper with the master keeper in another of the at least two machines. Each COSS is also capable of coordinated interaction with any other COSS within the loosely coupled CICS region. The suite of functions offer direct access to system and data resources from anywhere within the loosely coupled CICS region. Consequently, there is no system or data resource affinity between the address space in which each COSS is operating and the address space being occupied by the system and data resources.

40 Claims, 8 Drawing Sheets

OTHER PUBLICATIONS

Yukihisa Kageyama, "CICS Handbook" Copyright 1989, including Contents and Introduction to CICS Chapter 1, pp. 1–33, File Control (1): Random Access, Chapter 4, pp. 87–118, File Control (2): Sequential Access, Chapter 5, pp. 119–353, Intertext Publications, McGraw–Hill Book Company, New York.

IBM Corporation, "CICS/ESA System Programming Reference" Version 3, Release 3, Third Edition (Mar. 1992), Copyright 1992, including Contents and pp. v–xi and 1–122.

IBM Corporation, "CICS/ESA Application Programming Guide" Version 3, Release 3, Third Edition (Mar./1992), Copyright 1992, including Contents, Part 2 Intercommunication considerations Chapter 4, pp. 103–121, Access to system information Chapter 8, p. 141, Part 3 Files and Databases, pp. 151–177, Part 5 CICS management functions, pp. 299–342.

* cited by examiner

RDF Image

```
File-1
        File Attributes,
        File Un/Locked,
        File size,
        File name,
        File Location;
File-2
        File Attributes,
        File Un/Locked,
        File size,
        File name,
        File Location;
...

File-n
        File Attributes,
        File Un/Locked
        File name,
        File Location;
...

Terminal-x
        Terminal attributes,
        Terminal Address;
...

System Resource-y
        Resource attributes,
        Resource address,
        Resource size,...

CUSTOMER INFORMATION CONTROL SYSTEM APPLICATION PROGRAMMING INTERFACE, WITH GLOBAL AND LOCAL SYSTEM AND FILE CONTROL FUNCTIONS, IN A LOOSELY COUPLED DATA PROCESSING ENVIRONMENT

RELATED APPLICATIONS

This application is related to and incorporates herein by reference co-pending application titled "A Customer Information Control System Application Programming Interface, With Transient Data Functions, In A Loosely Coupled Data Processing Environment," Ser. No. 09/210,512 filed Dec. 11, 1998 and assigned to the assignee of the present application.

FIELD OF THE INVENTION

This application relates to information control systems and, specifically, to customer information control systems and methods with global and local file control functionality in a loosely coupled data processing environment.

BACKGROUND OF THE INVENTION

Data processing application programs, including information control application programs and, more particularly, customer information control application programs, regularly utilize an application programming interfaces (APIs) to access and manipulate various system and data resources such as customer database files, terminals, file attributes and more. The API typically provides a transparent connection between the data processing application programs and their respective system and data resources.

One API, known as the Customer Information Control System (CICS), is available from the IBM Corporation, Armonk, N.Y. CICS is a trademark of the IBM Corporation.

CICS is multithreaded software running as an on-line feature in a multitasking machine environment. CICS generally runs under the operating system as a high priority program that handles requests from application programs by building tasks to execute transactions invoked at a terminal during run-time of the application programs. In other words, CICS positions itself between the operating system and the application programs with the essential role of providing a suite of control and services functions that serve as an interface between the application programs and the operating system. Application programs, in turn, are developed for implementing the CICS services in order to form customer information database and/or data communication systems, by linking the CICS services with the application programs via, for example, a program library.

Hence, CICS provides a suite of functions for realizing the interface between such customer information control applications and their respective customer database or other system and data resources. The suite of functions of CICS API may be fashioned as a package in a conventional CICS process server (CPS).

The CPS is a multithreaded operating system capable of supporting multiple concurrent data processing application programs that invoke its suite of CICS functions. In a conventional data processing machine whose functionality is managed by an operating system, one or more than one CPS operates under the control of the operating system. The functionality of the data processing machine is associated with an address region being divided among its memory devices, including one or more of main memory, cache memory and virtual memory. In the conventional data processing machine, each CPS defines a distinct CICS region which occupies a segment of the address region, and each CPS is capable of communicating with another CPS.

Further, each CPS provides its suite of CICS functions to a particular group of concurrent customer information control applications for interfacing with the system and data resource within their CICS region. With these functions, the CPS offers access to information about the system and data resources. For example, through file control functions, the CPS offers access to the data resources such as records in database files.

However, in the conventional data processing machine, one CPS cannot provide a direct interface to system and data resources within the CICS region of another CPS. As a result, one customer information control application program in one CICS region cannot gain direct access to the system and data resources of a second customer information control application program in a different CICS region. Rather, a communication path must first be established from one CPS to the next CPS for transferring, accessing and manipulating information.

For example, in order to allow access to system and data resources, a shared address space which holds information about these resources is used. Each information table within this shared address space is accessed, one thread at a time, via a semaphore. As a result multiple concurrent threads compete for the right of entry to the shared address space.

Also for example, when browsing data sets in VSAM (virtual sequential access method) files, data processing application programs periodically transfer control to each other. When control is transferred to a program, it starts browsing at the point where the previous program stopped. To that end, information about the system and data sets, such as status or location (the point from which control passes to the next program for continued browsing or data manipulation) must be propagated from one program to the next. Hence, information must be transferred repeatedly among CPSs in order to maintain consistency of the information throughout the CICS region and in order to support these application programs reliably. This approach imposes a system performance penalty manifested by the substantial data transfer overhead.

As a result, conventional data processing machines are inflexible and cumbersome. Accordingly, a need exists for a more flexible data processing system. A need further exists for a data processing system in which access to system and data resources is not hindered by cumbersome mechanisms. The present invention addresses this and related purposes.

SUMMARY OF THE INVENTION

A preferred embodiment of the present invention provides a customer information control system (CICS) application programming interface (API), with global and local system and file control functions, in a loosely coupled data processing environment. In accordance with the purpose of the invention, as embodied and broadly described herein, the invention is directed to a method, system and computer readable medium for the local system and files control (hereafter collectively referred to as the "invention").

In particular, the invention implements a loosely coupled CICS region in a data processing environment, the loosely coupled CICS region includes at least two of a plurality of machines and their respective address spaces. The invention further includes allocating a flat segment in the address space of the at least two machines. The invention additionally includes providing a keeper process (hereafter referred to as the "keeper") in the address space of each of the at least two machines, one of the keepers being designated as a master keeper. Furthermore, the invention includes providing more that one CICS-API operating system server (COSS) within the loosely coupled CICS region, each COSS residing in one of the at least two address spaces within the loosely coupled CICS region, and each COSS being capable of coordinated interaction with any other COSS within the loosely coupled CICS region.

To that end, the invention also includes providing in each COSS a suite of functions including the global and local system and file control functions so that each COSS is capable of registering as a flat segment user and interfacing with a keeper and a master keeper, and so that each COSS is further capable of interfacing via the keeper with the master keeper in another of the at least two machines. The suite of functions offers direct access to system and data resources from anywhere within the loosely coupled CICS region. Consequently, there is no system or data resource affinity between the address space in which each COSS is operating and the address space being occupied by the system and data resources.

BRIEF DESCRIPTION OF THE DRAWINGS

The accompanying drawings, which are incorporated in and constitute a part of this specification, illustrate the preferred embodiment of the invention and, together with the description, serve to explain the principles of the invention.

FIG. 2B illustrates a resource definition file (RDF) image which is copied into a flat segment within the address space of the data processing machine of FIG. 2A.

DETAILED DESCRIPTION OF A PREFERRED EMBODIMENT

The present invention as hereafter described, provides a customer information control system (CICS) application programming interface (API), with global and local system and file control functions, in a data processing system environment. In a data processing system configured with a loosely coupled CICS region in accordance with the invention, easy, efficient and reliable access to system and file resources is offered from anywhere within a loosely coupled CICS (LC-CICS) region. Moreover, in accordance with the purpose of the invention as embodied and described herein the invention is directed to a method, system and computer readable medium with program instructions Reference will now by made in detail to a preferred embodiment of the invention which is illustrated in the accompanying drawings. Wherever convenient, the same reference numbers will be used throughout the drawings to refer to the same or like parts.

A. The LC-CICS Region

A preferred embodiment of the present invention provides a customer information control system (CICS) application programming interface (API) with global and local system and file control functions, in a loosely coupled data processing system environment. The loosely coupled data processing system is used for providing services such as, for example, parallel transactions processing (PTP) services. The preferred embodiment of the invention is implemented in a LC-CICS region of the loosely coupled data processing system environment.

Figure 1:
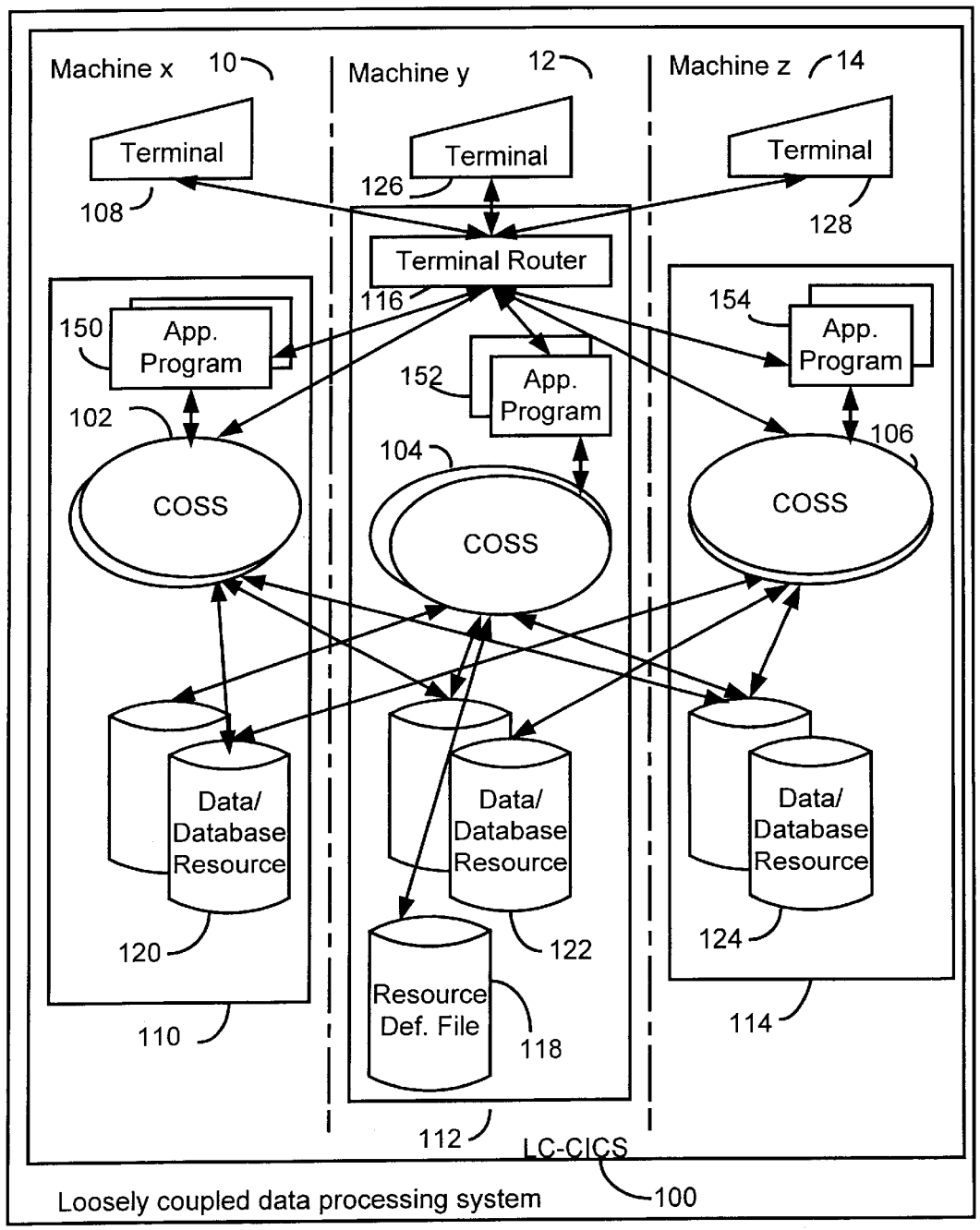
FIG. 1 shows an example of a loosely coupled data processing system with a loosely coupled customer information control system (LC-CICS) region in which an embodiment of the present invention can be implemented.

FIG. 1 shows an example of a loosely coupled data processing system in which an embodiment of the present invention can be implemented. The LC-CICS region 100 is spread among one or more than one loosely coupled data processing machine 10, 12 and 14. It can be readily appreciated that a data processing machine 10, 12 and 14, can be one or more of a desktop computer, laptop computer, workstation and alike. The functionality of each data processing machine 10, 12 and 14, is managed by a respective processor (not shown), and is associated with an address space 110, 112 and 114 being divided among its memory devices including one or more of main memory, cache and virtual memory. An address space of a data processing machine, e.g., 10, 12 and 14, typically includes a physical address space and a logical address space. Moreover, the functionality of each data processing machine 10, 12 and 14, includes a multithreaded operating system (not shown) which supports multiple concurrent data processing application programs, e.g., 150, 152 and 154, respectively. It should be readily understood that the multiple concurrent data processing application programs run under respective multithreaded operating systems.

In operation, system management and user interface functions are provided via terminals 108, 126 and 128. User commands in the form of transaction requests are preferably routed through a terminal routing process (TRP) 116, which is a multithreaded process mapping a screen menu and responding to the selection of menu items on the terminals 108, 126 and 128.

In this environment, a suite of functions including CICS-API functions compatible with the CICS functions by the IBM Corporation and the global and local system and file control (hereafter collectively referred to as the "suite of functions") is furnished as a package in a CICS-API operating system server (hereafter referred to as the "COSS") 102, 104 and 106, which runs under respective multithreaded operating systems. This functionality is preferably provided in more than one COSS 102, 104 and 106. Each COSS 102, 104 and 106, supports multiple concurrent data processing application programs, e.g., 150, 152 and 154, including, customer information control applications, providing them its suite of functions.

With this configuration, each data processing machine 10, 12 and 14, may have one or more COSSs 102, 104 and 106 in its address space. As illustrated, the LC-CICS region 100 in this environment is divided among the several data processing machines 10, 12 and 14, although it maintains the appearance of a single undivided CICS region to data processing application programs that use its facilities.

A person of ordinary skill in the relevant art should readily appreciate that, different system configurations may be used without departing from the scope and spirit of the present invention. For example, although each COSS 102, 104 and 106 resides, in its entirety, in one of the address spaces 110, 112 or 114, each COSS 102, 104 and 106 can be located within the respective address space 110, 112 or 114 in main or virtual memory. It should be further noted that, preferably, each LC-CICS region, e.g., 100, operates as an autonomous data processing environment with its own resources, although sharing of resources among different LC-CICS regions is technically possible.

Additionally, data resources 120, 122 and 124 within the LC-CICS region 100 such as database files may reside in their entirety in the address region of any participating data processing machine 10, 12 or 14, or they may be divided among several participating data processing machines 10, 12 and/or 14 (not shown). Importantly, regardless of how the LC-CICS region 100 is configured, the system and data resources and the information related thereto may be accessible from any data processing machine 10, 12 and 14, by any COSS 102, 104 and 106.

Also in this environment, one COSS 102, 104 or 106, can easily communicate with another COSS 102, 104 or 106, in the same LC-CICS region 100, even across the different, loosely coupled data processing machines 10, 12 and 14. Through efficient data resources sharing, every COSS 102, 104 and 106 can directly interface with the system and data resources irrespective of their locations within the LC-CICS region 100. Hence, using the information related thereto, each COSS 102, 104 and 106, can gain direct access to the shared system and data resources from anywhere within the LC-CICS region 100.

Moreover, to render the LC-CICS region 100 more effective, the inter-COSS communication and the system and files information sharing are coordinated. Preferably, the COSSs 102, 104 and 106 in the LC-CICS region 100 are capable of synchronous interaction with each other.

The LC-CICS region 100 provides a transparent interface between multiple concurrent customer information control application programs, e.g., 150, 152 and 152, and the system and data resources by connecting them through any available COSS 102, 104 or 106. Furthermore, in this environment, transaction requests from one or more terminals 108, 126 and 128, participating in any of the customer information control application programs 150, 152 and 154 can be routed (and even re-routed if the path first used fails) to any part of the system and data resources through any COSS 102, 104 or 106, in the LC-CICS region 100.

Transaction affinity describes a link between the location and address space usage of a CICS-API process server (CPS) and the location of system and data resources. In conventional data processing systems, this link confines the initiating and routing of transaction requests to the boundaries of a CICS region defined by the CPS. In other words, conventional data processing system environments are characterized by a strong transaction affinity since each CPS defines a distinct CICS region associated with its own address space which cannot be directly invaded by another CPS. Namely, each CPS can provide a direct interface only to a data resource within its address space.

In contrast to conventional data processing systems, the present invention advantageously eliminates this affinity, in that the invention provides the loosely coupled data processing system environment characterized by the LC-CICS region 100, as described above. This system environment may be, for example, a parallel transaction processing system for providing the PTP services.

Furthermore, in this loosely coupled data processing system environment the workload and system resources are spread among the loosely coupled data processing machines 10, 12, 14 and over their collective address space. Hence, this environment is flexible, efficient and easily implemented and managed.

To further facilitate the LC-CICS region 100 operation, a resource definition file (RDF) 118 is utilized as a repository containing system and data resources information. An image of the RDF, as explained more fully below, typically includes global system and files information such as file names, file locations, file attributes, system attributes etc. Additionally, a shared information management scheme is implemented for efficiently providing consistent and reliable system and data resources information.

B. Configuration of the Data Processing Machines Within the LC-CICS Region

Figure 2A:
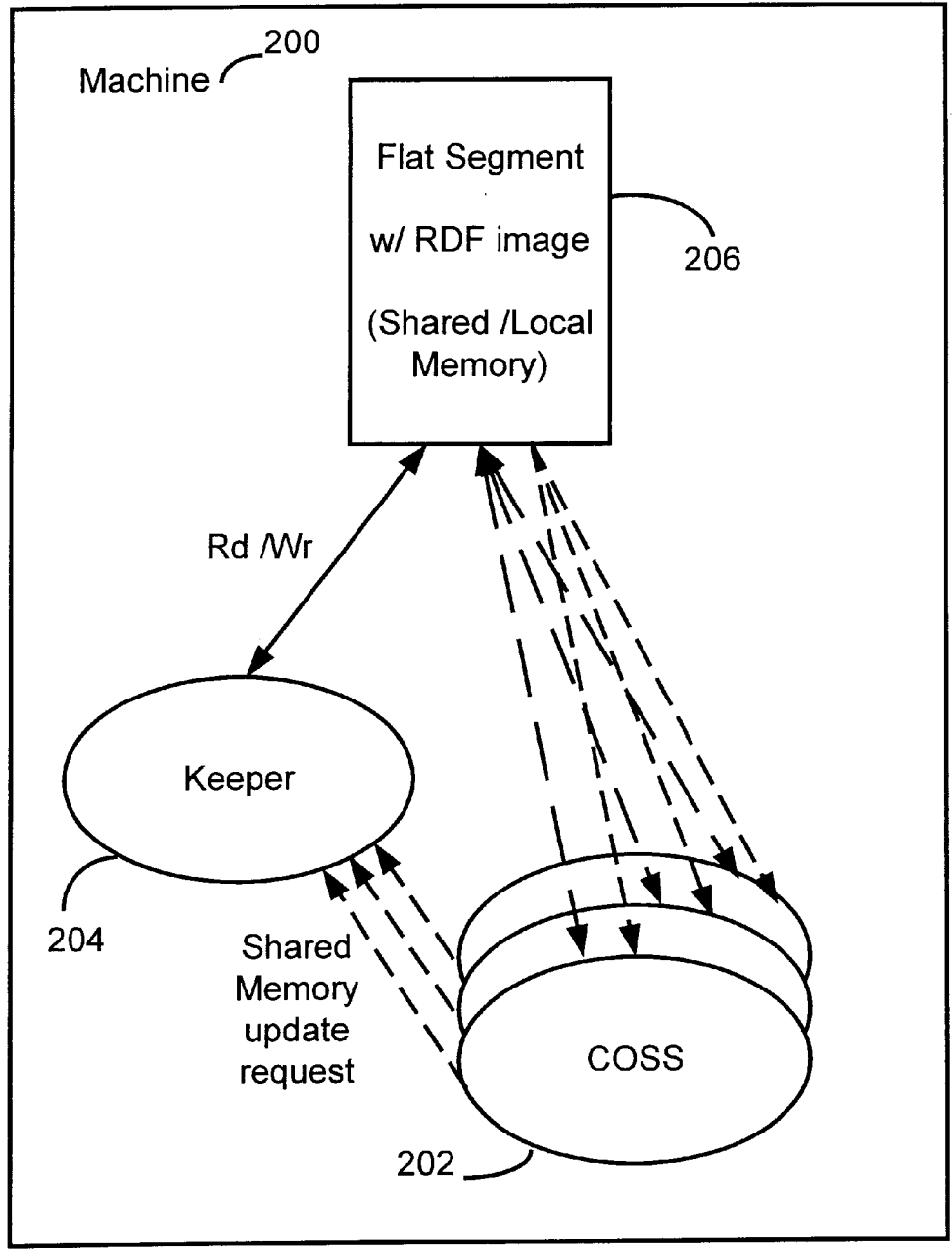
FIG. 2A illustrates a data processing machine configured for implementing the suite of functions including global and local system and file control functions in accordance with the preferred embodiment of the invention.

Shared information management scheme is utilized to implement the suite of functions with the global and local system and file control functions. FIG. 2A illustrates a data processing machine 200 configured for implementing these functions in accordance with a preferred embodiment of the invention.

It should be readily apparent that this data processing machine 200 is exemplary and can represent any one of the data processing machines 10, 12 or 14 of FIG. 1. It should be further apparent that any reasonable number of data processing machines can participate in the LC-CICS region and that each of them may be configured for supporting this scheme.

As shown in FIG. 2A, the data processing machine 200 includes in its address space one or more than one COSS 202. In order to provide for an efficient shared information management scheme, the data processing machine 200 is also configured to include a flat segment 206 and a flat segment keeper process (hereafter "keeper") 204. Upon being initialized, the flat segment 206 and keeper 204 reside locally in the address space of the data processing machine 200. Hence, with respect to each machine and the COSS(s) operating in its address space, the associated keeper and flat segment are termed local keeper and flat segment.

Each keeper, for example the keeper shown in FIG. 2A, is a software process which participates in the shared information management scheme. For instance, a keeper associated with a particular COSS provides to other keepers in the LC-CICS region any global system and data resources information updates which are produced by that COSS (e.g., file locked, moved etc.), as described in more detail herein below.

The flat segment 206 is memory space allocated locally in the data processing machine address space. A flat segment is allocated locally in each participating data processing machine address space. The flat segment 206 is used to minimize the data transfer frequency between the various data processing machines. Namely, the flat segment 206 is a local repository of system and data resources information shared by all COSSs, e.g., 202, that operate within the address space of the particular data processing machine, e.g., 200. With the flat segment 206 in place, the system and data resources information is available locally without having to repeatedly fetch it from a global shared repository.

A flat segment 206, is accessible for read and write operations by every COSS within the address space of the data processing machine 200. A flat segment, e.g., 206, may be used both as a local and as shared memory. When so used, every COSS operating within the LC-CICS region outside the address space of the data processing machine 200, channels global information updates to this flat segment 206 via a keeper, e.g., 204, instead of directly writing to the flat segment 206. In this case, the flat segment 206 is said to be a master flat segment because it includes global information updates—that is, updates having a global effect on the operations within the LC-CICS region. Also in this case, the keeper 204 is said to be a master keeper in charge of coordinating and propagating the global updates to the other keepers in the address space of other data processing machines.

As is further shown in FIG. 2A, the flat segment 206 is set up to hold an RDF image which is a copy of part or the entire RDF contents. FIG. 2B illustrates an RDF image which is loaded into a flat segment within the address space of the data processing machine of FIG. 2A. The RDF image 220 may include file definitions and information, terminal definitions and information, or other system resources definitions and information. The RDF image 200 may include definitions and information such as, for example, attributes, size, name, and location.

Figure 2C:
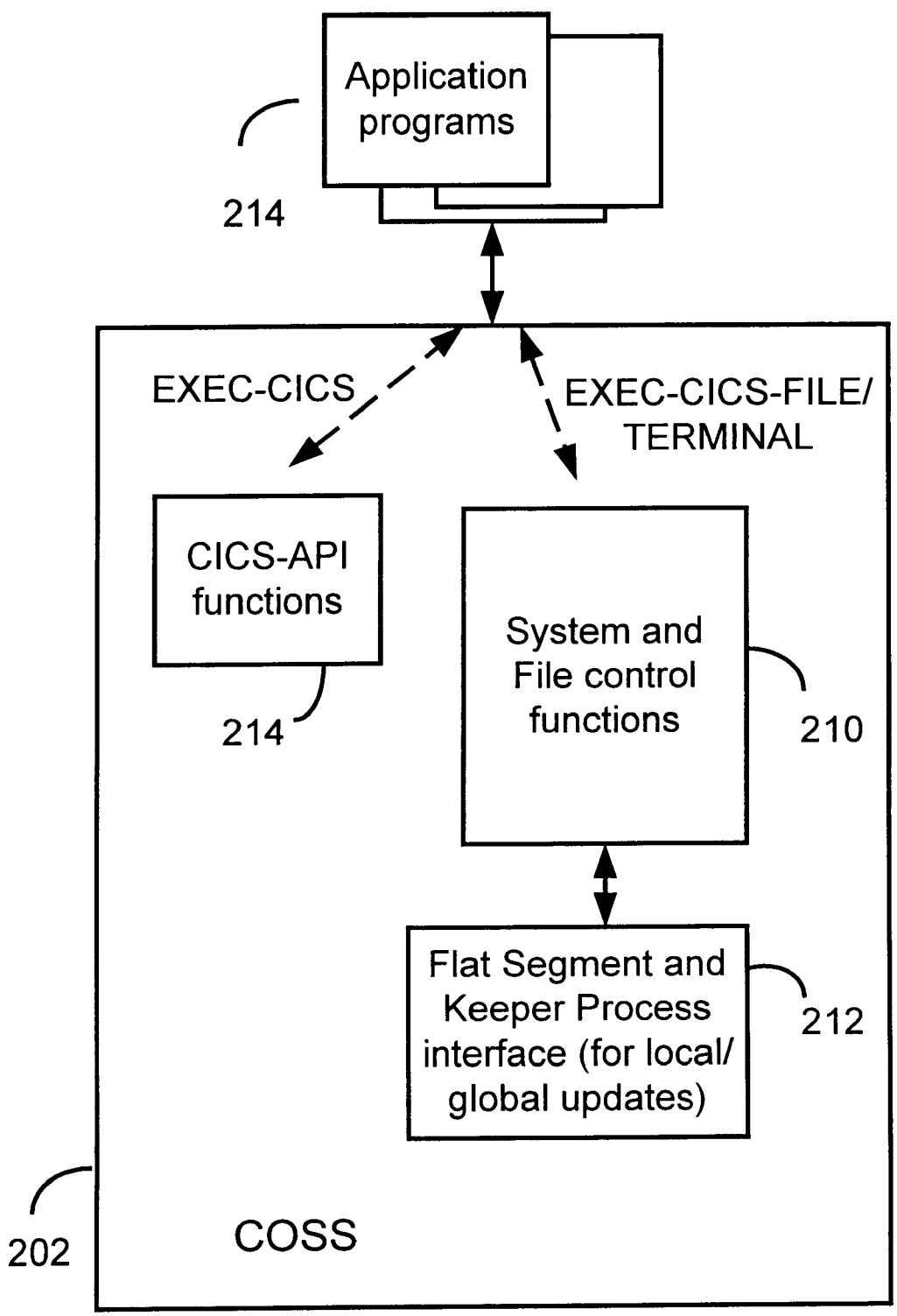
FIG. 2C illustrates the functionality of a CICS-API operating system server (COSS) operating in the data processing machine of FIG. 2A.

FIG. 2C illustrates the functionality of each COSS in the LC-CICS region including the COSS 202 in the data processing machine 200 of FIG. 2A. As shown in FIG. 2C, the suite of functions defining the functionality of each COSS, e.g., 202, includes the CICS-API functions 214 which are compatible with the CICS functions by the IBM Corporation, the system and file control functions 210 and an interface capability 212 for interfacing between the COSS and the local flat segment and keeper. In each machine, the flat segment and keeper participate in both global and local system and data resources information (hereafter "information") updates, as will be further described herein below.

These information updates are produced is response to function calls initiated by application programs. The function calls initiated by the application programs include executive-CICS (EXEC-CICS) commands. EXEC-CICS commands specify which CICS functions is to be executed. For example, EXEC-CICS-FILE{parameters} prompts execution of a file control function characterized by the parameters supplied to it. Also for example, EXEC-CICS-TERMINAL{parameters} prompts execution of a system resource, in this case terminal, control function.

The global and local system and file control enhances the functionality of each COSS in that it advantageously allows each COSS to efficiently propagate global information updates created thereby and maintain locally any information updates created thereby which have only a local effect. Namely, for local information updates, such as providing file handle for reading or writing data sets, the system and file control functions are local. Local information updates are characterized in that they need not be shared by other application programs in other machines and need not propagated to the other machines. The local system and file control functions are made possible by the direct interface between each COSS and the respective local flat segment.

In addition, global information updates are channeled through the associated local keeper to other keepers in order to maintain the system and file resources information up-to-date and consistent throughout the LC-CICS region. Global information updates include, for example, deleting or moving files or setting system resources.

Each COSS responds to system and file control commands from application programs, such as the EXEC-CICS-FILE/TERMINAL, in a special manner. However, aside from a noticeably improved efficiency and reliability, to the application programs this special approach is transparent. Moreover, the application programs are not made aware of the above-described global-local information updates treatment by each COSS. To the application programs, local and global system and file control functions are not visibly different from each other. Thus, application programs need not be concerned with modifying their function calls in order to accommodate this approach. In other words, Application programs can continue to use commands such as the EXEC-CICS-FILE/TERMINAL in order to invoke execution of the system and file control functions as provided in each COSS in accordance with the invention.

Figure 3:
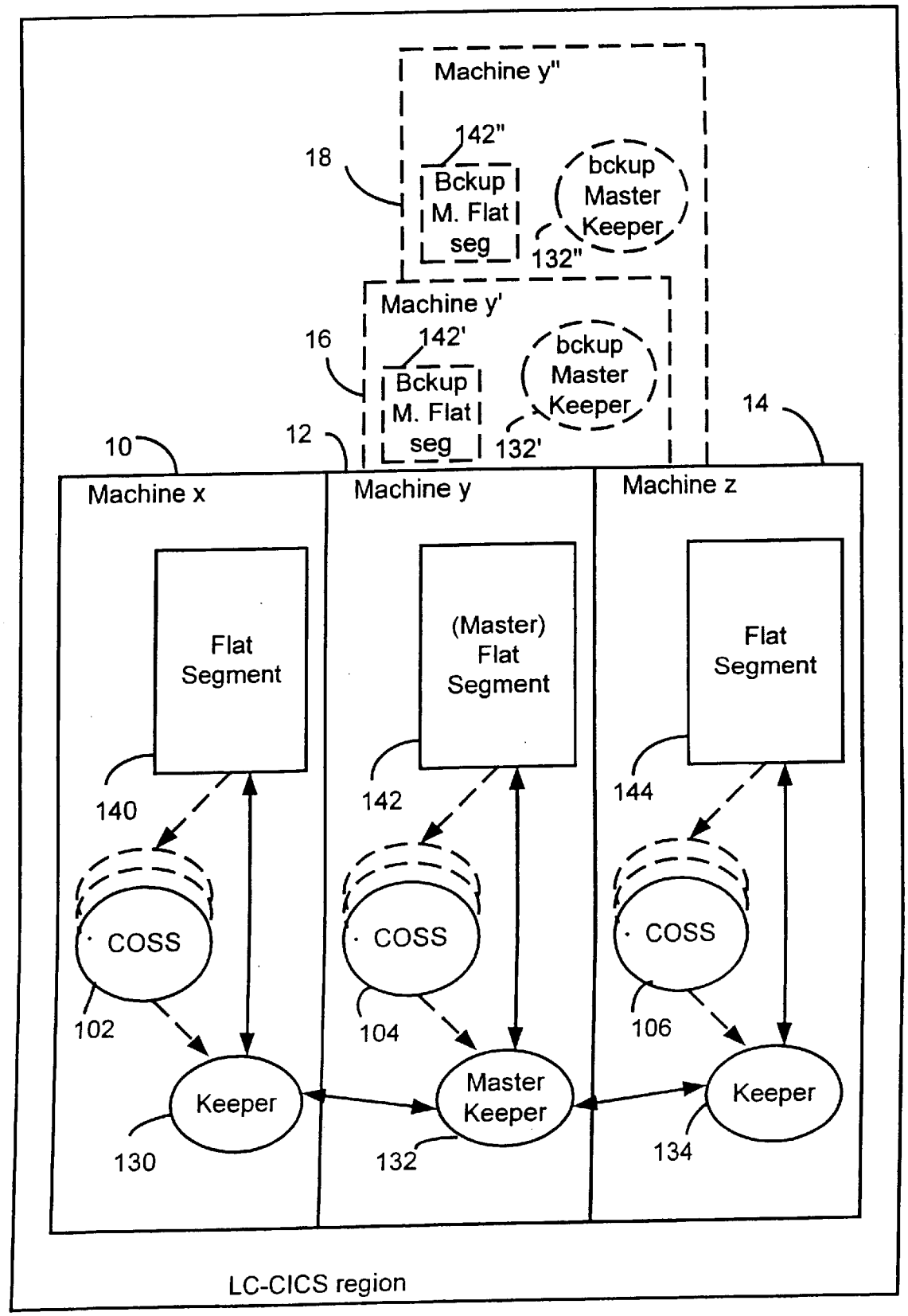
FIG. 3 illustrates the LC-CICS region with a plurality of data processing machines configured in accordance with the invention.

FIG. 3 illustrates the LC-CICS region 100 with a plurality of data processing machines 10, 12, 14, 16 and 18 configured in accordance with a preferred embodiment of the invention. Each of the data processing machines 10, 12, 14, 16 and 18, is configured to include a respective, local flat segment, e.g., 140, 142, 142', 142" and 144, and local keeper, e.g., 130, 132, 132', 132" and 134. One of the data processing machines 10, 12, 14, 16 and 18, for example data processing machine-y 12, is designated to include the primary master flat segment 142 and primary master keeper 132.

As previously explained, one or more than one COSS 102, 104 and 106 may operate in each of the data processing machines 10, 12 and 14. In the illustrated configuration, the one or more than one PTPS- COSS 102, 104 and 106, interfaces directly with the local flat segment 140, 142, and 146 in its respective address space. Each COSS, e.g., 102 and 106, operating outside the address space of the master flat segment and keeper, e.g., 142 and 132, channels global updates through the master keeper, e.g., 132, via the local keeper, e.g. 130 or 134.

Preferably, to guarantee that the data processing application programs survive a failure of a data processing machine with the master keeper, e.g., 132, it is possible to designate, via the RDF configuration, at least one additional data processing machine as the location where a backup master flat segment 142' and/or 142" will reside along with a corresponding backup master keeper 132' and/or 132". As illustrated, data processing machine-y' 16 and/or data processing machine-y" 18, may be designated as the location for the backup master flat segment 142' and/or 142" and the corresponding backup master keeper 132' and/or 132", although different, or more, data processing machines may be so designated.

It is noted that every keeper 130, 132, 132', 132" and 134 is capable of performing the functions of a master keeper and backup master keeper. However, only one keeper, e.g., 132, in the LC-CICS region is designated to be the primary master keeper and the other keepers 132' and 132", not yet designated as backup master keepers, are used as local keepers.

First, the primary master keeper, e.g. 132, activates a backup master flat segment a keeper, e.g., 132' or 132". At any one time, only one backup master flat segment and keeper, e.g., 142' and 132' or 142" and 132", are active. Second, the currently active backup master keeper, e.g., 132' or 132", monitors the master keeper, e.g. 132 for fitness or failure, and upon detecting a failure the currently active backup master flat segment and keeper, e.g., 142' and 132' or 142" and 132", becomes the new primary master flat segment and keeper. The new primary master keeper, e.g., 132' or 132", takes over the management of global updates and the corresponding flat segment 142' or 142" takes over the maintenance of global updates.

Further, as more than one data processing machine, e.g., 16 and 18, may be configured to hold a backup master flat segment and keeper, the first backup flat segment and keeper, e.g., 142' and 132', will invoked a second backup flat segment and keeper, e.g., 142" and 132", when the primary master flat segment and keeper, e.g., 132 and 142, are no longer available due to failure in the respective data processing machine 12. A third backup flat segment and keeper (not shown) will be invoked when the first master flat segment and keeper 132' and 142' are no longer available due to failure in the respective data processing machine, e.g., 16, and so on.

It should be readily apparent that any number of the data processing machines within the LC-CICS region 100 may be designated to hold a backup master flat segment and keeper, although, as mentioned, only one backup master flat segment and its corresponding keeper are active at any one time. It should be further apparent that any data processing machine which participates in the LC-CICS region 100 and which is configured in a manner as described above may be designated to hold the primary master flat segment and keeper.

C. Initial Set-Up of the LC-CICS Region

Figure 4:
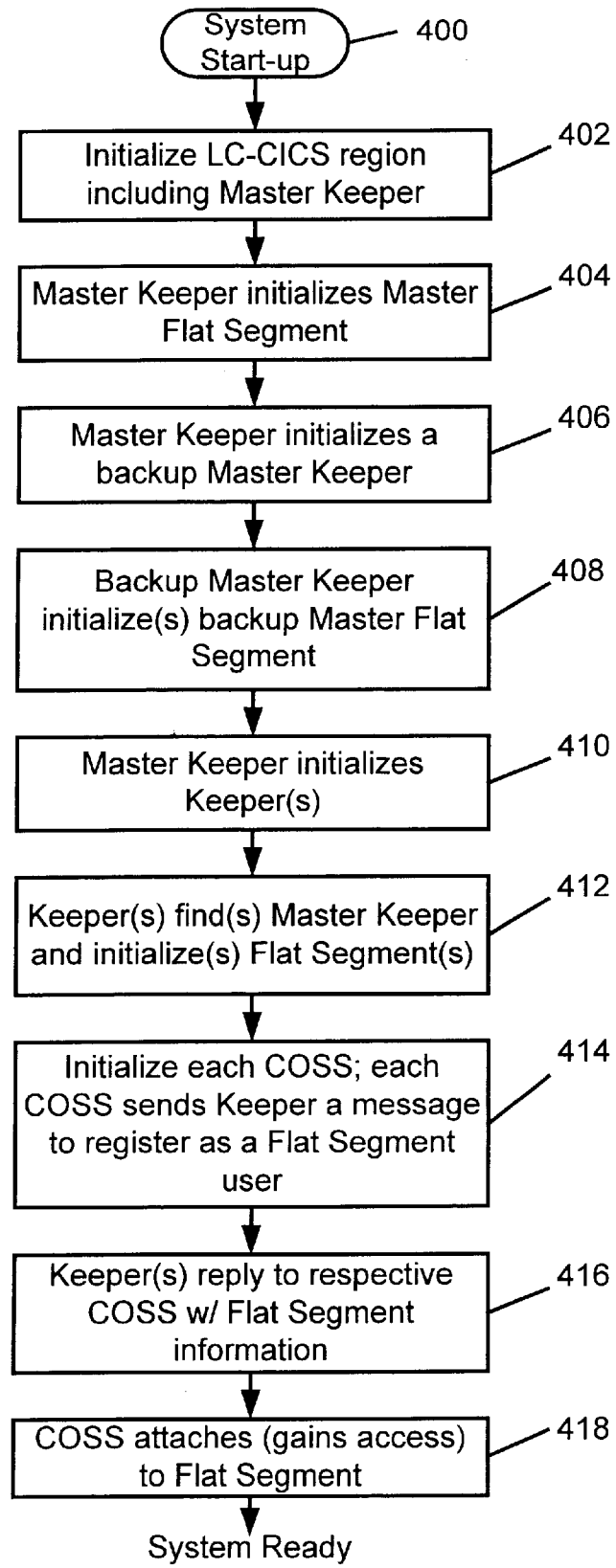
FIG. 4 is a flow diagram describing the initial set-up of the LC-CICS region with a shared information management functionality.

FIG. 4, is a flow diagram describing the initial set-up of the LC-CICS region with the shared information management that involves the global and local system and file control functionality. The initial set-up begins at system start-up, via step 400. Next, the LC-CICS region is initialized, via step 402. Upon initializing the LC-CICS region, the master keeper is initialized by, for example, receiving global LC-CICS region information and addresses, via step 402. One of these addresses points to the RDF (118, FIG. 1) which, as pointed before, is a repository of global system and file information.

Following the initialization of the master keeper, via step 402, the master keeper initializes the master flat segment, via step 404. To that end, once the respective address space has been allocated for the master flat segment (206, FIG. 2A), an image of either a part or the complete contents of the RDF (hereafter "RDF image"; 220 FIG. 2C) is created in the master flat segment. The extent of resource definition information needed to be included in this image is dependent on the characteristics of the LC-CICS region as defined, for example, by the suites of functions it provides.

Next, the master keeper initializes the backup master keeper, preferably in the address space of a different data processing machine, via step 406. The backup master keeper then initializes the backup master flat segment in its address space, via step 408. The RDF image is copied into the backup master flat segment by the backup master keeper.

The master keeper next initializes one or more keepers, one for each of the data processing machines which is not yet fully set up, for use as local keepers, via step 410. Upon being initialized, via step 410, each keeper receives information, e.g. pointer, directing it to the master keeper. Thus, each keeper uses this information to 'find' the master keeper and initialize the flat segment in its corresponding address space with a copy of the RDF image, via step 412.

Each COSS is initially configured to have the suite of functions as described above (and as illustrated in FIG. 2B). Each COSS in the LC-CICS region, having been configured with the above-described functionality and then initialized, sends the keeper, or master keeper, in its address space a flat segment user registration message including name and machine number, via step 414. This message allows the keeper to recognize and maintain a record of every COSS using the corresponding flat segment. The respective keeper replies to this message by providing the flat segment information (e.g., address, size and format) to each COSS registering to use it, via step 416. Using the flat segment information, each COSS 'attaches' itself to that flat segment, via step 418. From that point, each registered COSS has access to the flat segment in its own address space.

Also at this point the system is ready for the CICS-API including the global and local system and file control functions. It is noted that a parallel processing, loosely coupled system environment configured in accordance with the invention, provides the PTP services for the CICS-API with the global and local system and file control functions.

D. The Global and Local System and File Control Functions in the LC-CICS Region

The suite of functions with the global and local system and file control functions greatly enhances the system and data resources management, particularly access thereto, within the LC-CICS region. This aspect of the invention can be better understood from the discussion that follows.

In operation, system and file control functions offer access to system and data resources. For example, file control offers access to data sets. Data sets may be managed, for instance, by virtual storage access methods (VSAM). Data processing application programs, particularly customer information control programs, that run in the LC-CICS region, regularly read and write data in the form of records that are uniquely identified and associated with a particular data set. To access these records the data processing application programs also specify the file and storage area of the records. In addition, the data processing application programs are responsive to the type and format of the system and data resources such as the VSAM data sets which are stored in the VSAM files.

VSAM files typically include key-sequenced data sets, entry-sequenced data sets or relative record data sets. A key-sequenced data set has each of its records identified by a unique key. The key occupies a predetermined field within the record. The key is related to an index which allows locating the record in the data set. When records are added or deleted, the index is updated accordingly.

In an entry-sequenced data set, each record is identified by its relative byte address which is determined by the order in which the record was added to the data set. Such records are browsed in the same order as they are added.

A relative-record data set has predetermined segments in which records may be stored. Each segment may be defined by a number. The segment number of the segment holding a record is used to identify the record.

In an LC-CICS region in accordance with the invention, the suite of functions with the global and local system and file control functions facilitates efficient system and data resources management. For example, local file control functions facilitate efficient reading, updating, adding, deleting and browsing of data in data sets. To that end, each COSS is configured to perform the suite of functions including the global and local system and file control functions in response to commands issued by application programs. Additionally, an image of the system and data resources information (220, FIG. 2B), as defined in the RDF (118, FIG. 1), is available locally in an associated flat segment for shared use by each COSS in the LC-CICS region that is registered to use it. The information indicates system and data files characteristics including location and type, e.g., VSAM files, record length, if applicable, etc.

As mentioned, EXEC-CICS commands from the application programs specify which of the functions is to be executed. For example, EXEC-CICS-FILE{parameters} prompts execution of a file control function characterized by the parameters supplied to it.

Figure 5:
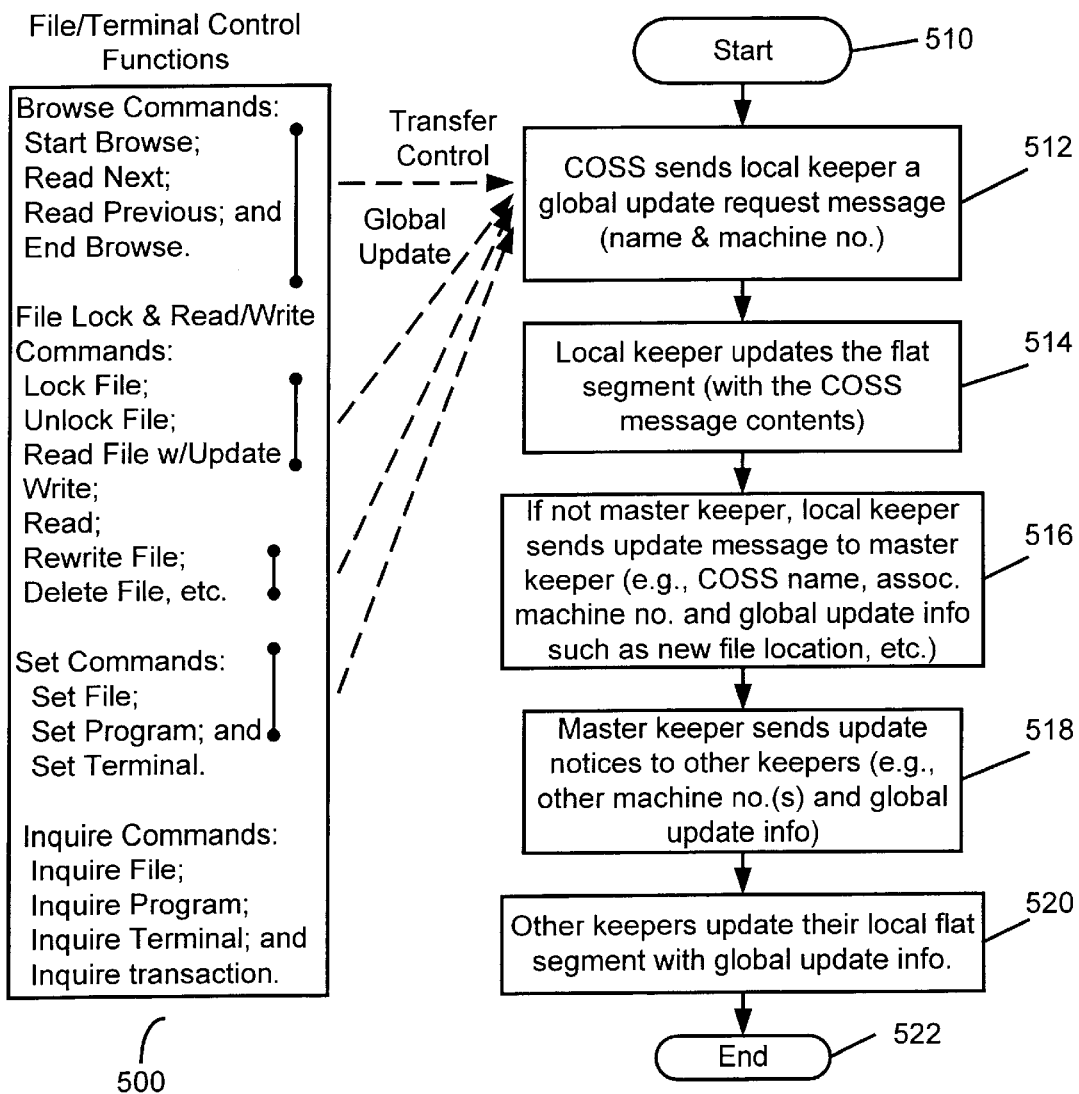
FIG. 5 illustrates the types of system and file control functions which involve data transfer management within the LC-CICS region, and the process of managing the data transfer.

FIG. 5, illustrates the types of system and file control functions which involve information transfer management within the LC-CICS region, and the process of managing that information transfer. The EXEC-CICS commands 500 which invoke the system and file control functions include, for example, 'Start', 'End', 'Browse', 'Lock', 'Unlock', 'Read', 'Write', 'Read Previous/Next', 'Delete', 'Set' and 'Inquire' commands. This list is representative, but not exhaustive, of the types of commands supported by each COSS in the LC-CICS region.

Reading records in VSAM files, for instance, may be direct reading or sequential reading. Data processing application programs invoke direct reading of records by prompting 'Read' commands which identify the record(s) to be read and their length if needed. Sequential reading of records is known as browsing. Data processing application programs start browsing with a 'Start Browse' command and end browsing with an 'End Browse' command. The 'Start Browse' commands identify a browse starting point, and the 'Read Next' commands access the records from that starting point and forward. To browse a VSAM file backwards, the 'Read Previous' command allows access to records before the starting point.

In general, the 'Browse', 'Lock'-'Unlock' and 'Set' commands produce a global effect within the LC-CICS region. For example, data processing application programs, such as customer information control programs, transfer control from one to another during VSAM files browsing. The 'Browse' command is associated with start and end browse points that need to be propagated from one data processing application program to the next in order to allow each of them to pick up the browsing where the predecessor left off. Also for example, the 'Set' command provides access to and allows the change of system and data resources definitions and status wherever they are. In contrast, 'Inquire' commands as well as 'Read' and 'Write' commands typically have only a local effect within the boundary of a particular data processing machine address space. The 'Inquire' command provides access and retrieval of system and data resources definitions and status, typically as a precursor to other operations. Commands having a global effect are indicated in FIG. 5 by the vertical bars.

In response to commands such as the 'Inquire' command which have only a local effect, each COSS interfaces directly with the local flat segment, that is, the flat segment in its address space. This approach saves the need to transfer related information to a shared space or to other address spaces.

In response to commands which have a global effect in the LC-CICS region, such as the 'Set', 'Browse' and 'Lock'-'Unlock' commands, each COSS channels the information to the designated master keeper through the respective local keeper as shown in FIG. 5. The master keeper, being a hub for all the global updates, maintains consistency of this information throughout the LC-CICS region.

As a result, each COSS provides a noticeably efficient and reliable support to data processing application programs that transfer control from one to another. Also as a result, each COSS in conjunction with the respective local flat segment and keeper and master keeper, produces noticeably efficient and reliable information updates, both global and local.

As illustrated in FIG. 5, the global information update process starts, via step 510, and proceeds with a COSS sending a global update request message to the keeper in its address space, via step 512. The message includes, as a form of identification, the COSS name and corresponding machine number. The respective keeper updates locally the flat segment associated with that COSS, via step 514. In addition, if the keeper is not a master keeper, the keeper sends an update message to the master keeper, via step 516. An update message from a local keeper may include a name of the COSS that generated the global information update, an associated data processing machine number, and the global information update.

The master keeper, in turn, sends update notices to the other keepers in the LC-CICS region, via step 518. An update notice from the master keeper may include the data processing machine numbers of all the other data processing machines as well as the global information update. Upon receiving the update notice from the master keeper, the other keepers update the system and data resources information in their respective local flat segment, via step 520. Namely, the keepers update the RDF image in their respective local flat segments. The global update process whereby the inter-COSS interaction is well coordinated ends, via step 522.

In comparison to global information updates, local information updates do not require intervention by any keepers because such information updates need not be propagated to other data processing machines throughout the LC-CICS region. Thus, the local system and file control functions reduce the number of global updates in the system and, in turn, increase its operating efficiency.

E. Fault Tolerance and Failure Recovery

Preferably, at least one data processing machine is designated to hold a backup master flat segment and keeper in order to allow data processing application programs to survive a partial LC-CICS region failure. It may be recalled that although more that one data processing machine may be configured to hold the backup master flat segment and keeper, only one backup master flat segment and keeper may be active at any particular time.

Figure 6:
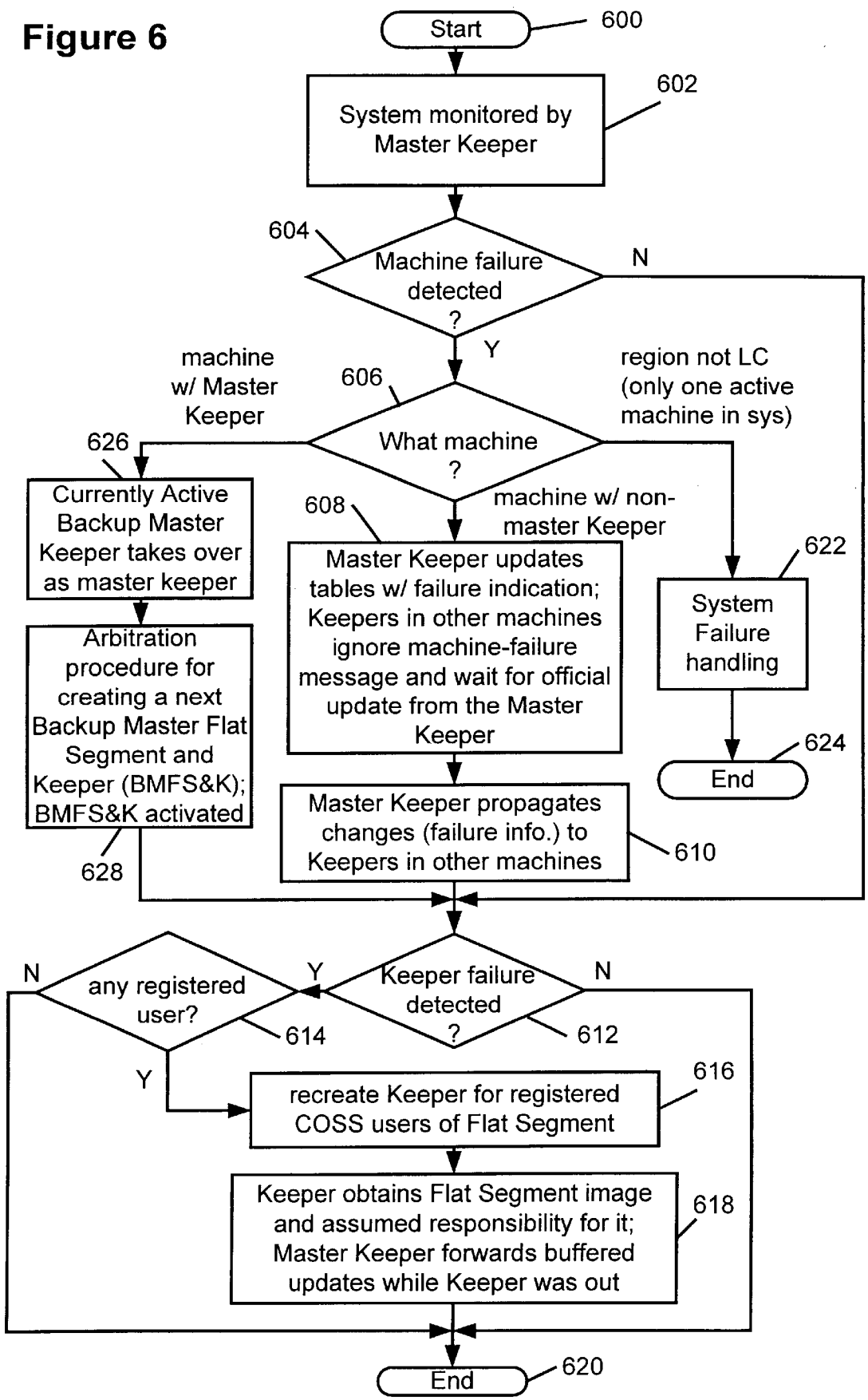
FIG. 6 is a flow diagram illustrating failure and fault tolerance handling in the LC-CICS region.

FIG. 6, is a flow diagram illustrating the response to a failure in the LC-CICS region. As shown, the LC-CICS region starts operating at step 600. In operation, the system encompassing the LC-CICS region is monitored by the master keeper, via step 602. If a data processing machine failure is not detected, via step 604, then the master keeper proceeds to detect keeper failure as explained below.

If a data processing machine failure is discovered, via step 604, a determination is made as to which machine has failed, via step 606. If the failed data processing machine was the only active data processing machine, which means that the environment has not been or no longer is an LC-CICS region, than system failure handling is performed, via step 622.

On the other hand, if the data processing machine designated to hold the master flat segment and keeper has failed, the currently active backup master flat segment and keeper takes over the management tasks as the new primary master keeper, via step 626. Then an arbitration procedure is invoked for creating a next backup master flat segment and keeper in a next available data processing machine which is designated to hold a backup master flat segment and keeper, and the selected backup master flat segment and keeper are activated by the (new) master keeper, via step 628.

It is important to note, that if more than one data processing machine is designated to hold a backup master flat segment and keeper, then in case of a failure of one such machine, a next-in-line machine takes over in a procedure as described above in steps 626 and 628. The arbitration process selects the next-in-line data processing machine until all such machines have been exhausted.

Alternatively, if a data processing machine holding a non-master keeper has failed, then the master keeper updates its local tables (in the flat segment) with the failure indication, via step 608. Keepers in the remaining data processing machines ignore whatever failure messages they receive and wait for an official update notice from the master keeper, also via step 608. The master keeper, in turn, propagates the official update notice to the keepers in the remaining data processing machines, via step 710.

Next, irrespective of the data processing machines failure detection, if any, it is also determined whether a keeper has failed, via step 612. If none failed then the process ends, via step 620. On the other hand, if a keeper failed it is next determined if there is any COSS registered to use the flat segment which is associated with the failed keeper, via step 614. If this flat segment does have registered users than a keeper is recreated in place of the one which failed, via step 616. The newly created keeper obtains the flat segment image, i.e., the RDF image, and subsequently assumes responsibility for it, via step 618. In addition, the master keeper forwards buffered update notices which it accumulated while the keeper was not available, also via step 618. Then the failure handling procedure ends, via step 620.

F. Summary

In summary, the present invention provides a CICS-API with the global and local system and file control functions, in a loosely coupled data processing system environment. The suite of functions including the global and local system and file control functions in accordance with the invention offer easy, reliable and efficient system resources and files access and management from anywhere within the LC-CICS region of the loosely coupled data processing environment. Further, each COSS configured in accordance with the invention produces noticeably efficient and reliable system and file information updates, both global and local, and provides noticeably efficient and reliable support to data processing application programs that transfer control from one to another.

Other embodiments should be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for providing a customer information control system (CICS) application programming interface (API), with global and local system and file control functions, in a data processing environment, the method comprising:

implementing a loosely coupled CICS region in the data processing environment, the loosely coupled CICS region including at least two of a plurality of machines and their respective address spaces;

allocating a flat segment in the address space of each of the at least two machines;

providing a keeper in the address space of the at least two machines, one of the keepers being designated as a master keeper and the flat segment associated therewith being designated as a master flat segment;

providing more than one CICS-API operating system server (COSS) within the loosely coupled CICS region, each COSS residing in one of the at least two address spaces within the loosely coupled CICS region; and providing a suite of functions including the global and local system and file control functions in each COSS so that each COSS is capable of registering as a flat segment user and interfacing with a keeper and a master keeper, and so that each COSS is further capable of interfacing via the keeper with the master keeper in another of the at least two machines, each COSS being also capable of coordinated interaction with any other COSS within the loosely coupled CICS region, the suite of functions offering each COSS direct access to system and data resources from anywhere within the loosely coupled CICS region.

2. A method according to claim 1, wherein each flat segment is set up to hold an image of the system and data resources definitions.

3. A method according to claim 2, wherein the repository is stored in a resource definition file (RDF).

4. A method according to claim 1, wherein the at least one COSS is configured as a PTP services for the CICS-API operating system server (COSS).

5. A method according to claim 1, wherein the interfacing capability of each COSS is for sending global updates via the keeper and for maintaining local updates locally in the flat segment, wherein each flat segment can be accessed directly for local updates by a COSS registered as the flat segment user.

6. A method according to claim 1, the method further including:

providing the system and data resources within the loosely coupled CICS region, each COSS being capable of directly accessing the system and data resources from anywhere in the loosely coupled CICS region irrespective of which address space the COSS is operating in, wherein there is no affinity between the address space in which each COSS is operating and the address space being occupied by the system and data resources, and wherein the global and local system and file control functions offer efficient and reliable access to the system and data resources.

7. A method according to claim 1, the method further including:

providing a repository of information including a definition of the system and data resources in the loosely coupled CICS region for future reference, an image of the repository information being created in each of the flat segments.

8. A method according to claim 1, wherein the implementing step further includes:

starting-up the data processing environment; and initializing the loosely coupled CICS region.

9. A method according to claim 1, wherein the data processing environment is a loosely coupled data processing system environment.

10. A method according to claim 1, wherein the data processing environment is a loosely coupled parallel processing system environment for providing parallel transaction processing (PTP) services for the CICS-API.

11. A method according to claim 1, wherein the coordinated interaction is asynchronous.

12. A method according to claim 1, wherein the plurality of machines are loosely coupled.

13. A method according to claim 1, wherein the functionality of each machine is managed by a processor.

14. A method according to claim 1, wherein the functionality of each machine includes a multithreaded operating system capable of supporting a plurality of application programs including customer information control applications.

15. A method according to claim 14, wherein each COSS operates under the respective multithreaded operating system and is capable of supporting the plurality of customer information control applications.

16. A method according to claim 1, wherein the suite of functions including the global and local system and file control functions are prompted by transaction requests issued during application programs runtime, and wherein the global and local system and file control functions include functions such as browse, lock, unlock, read, write, delete, set and inquire.

17. A method for providing parallel transaction processing a customer information control system (CICS) application programming interface (API), with global and local system and file control functions, in a data processing environment, the method comprising:

providing a loosely coupled CICS region in the data processing environment, the loosely coupled CICS region being configured to carry out a shared information management scheme and including at least two of a plurality of machines and their respective address spaces, each of the address spaces being set-up to include at least one CICS-API operating system server (COSS), a flat segment and a keeper associated therewith;

providing system and data resources information within the loosely coupled CICS region;

providing in each COSS a suite of functions including the global and local system and file control functions for participating in the shared information management by registering as a flat segment user, interfacing with a keeper, interfacing with a master keeper in another machine via the keeper, and engaging in coordinated interaction with any other COSS within the loosely coupled CICS region; and initializing the loosely coupled CICS region in which each COSS is capable of directly accessing system and data resources from anywhere irrespective of which address space the COSS is operating in.

18. A method according to claim 17, wherein each keeper is configured to include the functionality of the master keeper, and wherein the shared information management scheme further includes:

allocating memory in each of the address spaces for the flat segment, each flat segment for holding an image of the system and data resources information and definitions; and designating one of the keepers as the master keeper, the master keeper being a process responsive to global update requests which COSSs send via their respective keepers, wherein the master keeper facilitates the coordinated interaction between COSSs.

19. A method according to claim 18, wherein the shared information management scheme further includes:

designating the master keeper as a primary master keeper; and designating at least one of the remaining keepers as a backup master keeper for providing fault tolerance upon failure of the master keeper or a previously designated backup master keeper.

20. A method according to claim 17, wherein the initializing step further includes:

initializing the master keeper, utilizing the master keeper to initialize the flat segment associated therewith;

utilizing the master keeper to initialize at least one keeper;

utilizing each of the at least one keeper to initialize the flat segment associated therewith; and registering the at least one COSS as a flat segment user, each of the at least one COSS receiving flat segment information from the keeper associated therewith so that the COSS can gain access to the flat segment.

21. A method according to claim 20, wherein at least one of the keepers is designated as a backup master keeper for fault tolerance, wherein only one backup master keeper is active at any particular time, and wherein a first of the at least one backup master keeper is activated by the master keeper.

22. A method according to claim 17, wherein the shared information management scheme further includes global updates, the global updates including:

sending a global update request from a COSS to the keeper associated therewith;

updating the flat segment associated with the keeper;

sending an update message from the keeper to the master keeper, if the keeper is not a master keeper;

sending update notices from the master keeper to other keepers; and updating flat segments associated with the other keepers.

23. A method according to claim 17, wherein the shared information management scheme further includes local updates, the local updates being performed by a COSS directly without need for keeper intervention, and wherein the local updates reduce the number of global updates in the loosely coupled CICS region.

24. A method according to claim 17, wherein the shared information management scheme further includes failure handling, the failure handling Including the steps of:

determining if a machine has failed and, if so, determining which machine has failed; and determining if a keeper has failed.

25. A method according to claim 24, wherein if a machine has failed the failure handling further includes:

prompting a currently active backup master keeper to take over as a new active master keeper, if the failed machine includes a currently active master keeper;

selecting a backup master keeper, if the failed machine includes a currently active master keeper, and if a keeper designated as a backup master keeper is available; and sending update notices from the master keeper to other keepers if the failed machine includes a keeper rather than a master keeper.

26. A method according to claim 24, wherein if a keeper has failed the failure handling further includes:

determining if there is at least one COSS registered as a flat segment user of the flat segment that is associated with the failed keeper; and recreating a keeper in place of the failed keeper and if there is at least one COSS registered as the flat segment user, the recreated keeper receiving buffered global updates from the master keeper.

27. A system for providing a customer information control system (CICS) application programming interface (API), with global and local system and file control functions, in a loosely coupled data processing environment comprising a plurality of loosely coupled machines, the system comprising:

a loosely coupled CICS region configured to carry out a shared information management scheme and including at least two of the plurality of machines and their respective address spaces;

a flat segment in each of the address spaces;

a keeper associated with the flat segment in each of the address spaces;

more than one CICS-API operating system server (COSS) residing in one of the at least two address spaces, each COSS being capable of performing a suite of functions including the global and local system and file control functions for participating in the shared information management including by registering as a flat segment user, interfacing with a keeper, interfacing with a master keeper in another machine via the keeper, and engaging in coordinated interaction with any other COSS within the loosely coupled CICS region; and system and data resources within the loosely coupled CICS region, each COSS being capable of directly accessing the system and data resources from anywhere irrespective of which address space the COSS is operating in.

28. A system for providing a customer information control system (CICS) application programming interface (API), with global and local system and file control functions, in a loosely coupled data processing environment comprising a plurality of loosely coupled machines, the system comprising:

means for implementing a loosely coupled CICS region in the data processing environment, the loosely coupled CICS region including at least two of a plurality of machines and their respective address spaces;

means coupled to the implementing means for allocating a flat segment in the address space of each of the at least two machines;

means coupled to the allocating means for providing a keeper in the address space of each of the at least two machines, one of the keepers being designated as a master keeper;

means coupled to the keeper providing means for providing more than one CICS-API operating system server (COSS) within the loosely coupled CICS region, each COSS residing in one of the at least two address spaces within the loosely coupled CICS region; and means coupled to the COSS providing means for providing a suite of functions including the global and local system and file control functions in each COSS so that each COSS is capable of registering as a flat segment user and interfacing with a keeper and a master keeper, and so that each COSS is further capable of interfacing via the keeper with the master keeper in another of the at least two machines, each COSS being also capable of coordinated interaction with any other COSS within the loosely coupled CICS region, the suite of functions offering each COSS direct access to system and data resources from anywhere within the loosely coupled CICS region.

29. A system according to claim 28, in which the interfacing capability of the COSS is for sending global updates via the keeper and for maintaining local updates locally in the flat segment, wherein each flat segment can be accessed directly for local updates by a COSS registered as the flat segment user.

30. A system according to claim 28, the system further including:

means within the loosely coupled CICS region for providing the system and data resources, each COSS being capable of directly accessing the system and data resources from anywhere in the loosely coupled CICS region irrespective of which address space the COSS is operating in, wherein there is no affinity between the address space in which each COSS is operating and the address space being occupied by the system and data resources, and wherein the global and local system and file control functions offer efficient and reliable access to the system and data resources.

31. A system according to claim 28, the system further including:

means coupled to the allocating means for providing a repository of information including a definition of the system and data resources in the loosely coupled CICS region for future reference, an image of the information being created in each of the flat segments.

32. A system according to claim 31, wherein the repository is stored in a resource definition file (RDF).

33. A system according to claim 28, wherein the data processing environment comprises a loosely coupled processing system environment.

34. A system according to claim 28, wherein the data processing environment comprises a loosely coupled parallel processing system environment for providing parallel transaction processing (PTP) services for the CICS-API.

35. A system according to claim 28, wherein the functionality of each machine is managed by a processor.

36. A system according to claim 28, wherein each machine is a computer.

37. A system according to claim 28, wherein the functionality of each machine includes a multithreaded operating system capable of supporting a plurality of applications including customer information control applications.

38. A system according to claim 37, wherein each COSS operates under the respective multithreaded operating system and is capable of supporting the plurality of customer information control applications, wherein each COSS is positioned between the respective operating system and the application programs is supports.

39. A system according to claim 28, wherein the suite of functions including the global and local system and file control functions are prompted by transaction requests issued during application programs runtime, and wherein the global and local system and file control functions include functions such as browse, lock, unlock, read, write, delete, set and inquire.

40. A computer program product, comprising:

a computer useable medium having computer readable code embodied therein for providing a customer information control system (CICS) application programming interface (API), with global and local system and file control, the computer program product comprising:

computer readable program code configured to cause a computer to effect implementing a loosely coupled CICS region, the loosely coupled CICS region including at least two of a plurality of computers and their respective address spaces;

computer readable program code configured to cause a computer to effect allocating a flat segment in the address space of each of the at least two computers;

computer readable program code configured to cause a computer to effect providing a keeper in the address space of each of the at least two machines, one of the keepers being designated as a master keeper;

computer readable program code configured to cause a computer to effect providing more than one CICS-API operating system server (COSS) within the loosely coupled CICS region, each COSS residing in one of the at least two address spaces within the loosely coupled CICS region; and computer readable program code configured to cause a computer to effect providing a suite of functions including the global and local system and file control functions in each COSS so that each COSS is capable of registering as a flat segment user and interfacing with a keeper and a master keeper, and so that each COSS is further capable of interfacing via the keeper with the master keeper in another of the at least two machines, each COSS being also capable of coordinated interaction with any other COSS within the loosely coupled CICS region, the suite of functions offering each COSS direct access to system and data resources from anywhere within the loosely coupled CICS region.

* * * * *